(12) United States Patent
Watanabe et al.

(10) Patent No.: US 8,751,874 B2
(45) Date of Patent: Jun. 10, 2014

(54) MANAGING APPARATUS, MANAGING METHOD

(75) Inventors: Yukihiro Watanabe, Kawasaki (JP); Yasuhide Matsumoto, Kawasaki (JP); Masazumi Matsubara, Kawasaki (JP); Atsuji Sekiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 266 days.

(21) Appl. No.: 13/292,493

(22) Filed: Nov. 9, 2011

(65) Prior Publication Data

US 2012/0151282 A1 Jun. 14, 2012

(30) Foreign Application Priority Data

Dec. 10, 2010 (JP) .................................. 2010-275215

(51) Int. Cl.
*G06F 11/00* (2006.01)
(52) U.S. Cl.
USPC ............................. 714/47.2; 714/47.1; 714/48
(58) Field of Classification Search
USPC ........... 714/25, 26, 30, 33, 38.1, 39, 45, 47.1, 714/47.2, 47.3, 48, 49
See application file for complete search history.

(56) References Cited

U.S. PATENT DOCUMENTS

| | | | |
|---|---|---|---|
| 5,699,403 A | 12/1997 | Ronnen | |
| 5,699,502 A | 12/1997 | Swanberg et al. | |
| 7,124,060 B1 * | 10/2006 | Eriksson et al. | ................ 714/48 |
| 7,542,877 B2 | 6/2009 | Nakamura | |
| 7,827,447 B2 * | 11/2010 | Eberbach et al. | ............... 714/45 |
| 8,010,675 B2 | 8/2011 | Tanimoto | |
| 2005/0246590 A1 * | 11/2005 | Lancaster | ...................... 714/47 |
| 2006/0256714 A1 | 11/2006 | Takagi | |
| 2009/0070640 A1 * | 3/2009 | Stabile et al. | ................... 714/57 |
| 2011/0208679 A1 | 8/2011 | Watanabe et al. | |

FOREIGN PATENT DOCUMENTS

| | | |
|---|---|---|
| JP | 8-307524 | 11/1996 |
| JP | 9-167099 A | 6/1997 |
| JP | 2001-292143 A | 10/2001 |
| JP | 2005-184267 A | 7/2005 |
| JP | 2005-184500 A | 7/2005 |
| JP | 2006-318071 A | 11/2006 |
| JP | 2007-257184 A | 10/2007 |
| JP | 2008-9842 A | 1/2008 |
| JP | 2009-75817 A | 4/2009 |
| JP | 2009-159129 A | 7/2009 |
| JP | 2009-217381 A | 9/2009 |
| JP | 2010-49551 A | 3/2010 |

* cited by examiner

*Primary Examiner* — Joseph D Manoskey
(74) *Attorney, Agent, or Firm* — Fujitsu Patent Center

(57) ABSTRACT

A managing apparatus includes: a storing unit configured to store fault co-occurrence information storing the number of detection times that a first message pattern indicating a message group including messages received from an information processing system in a predetermined duration is deleted; a determining unit configured to detect the first message pattern, to read the number of detection times from the fault co-occurrence information, to calculate a co-occurrence probability of the fault and the first message pattern based on the number of detection times, and to determine that the fault has occurred if the co-occurrence probability is equal to or higher than a threshold value; and an updating unit configured to create a second message pattern indicating a message group obtained by excluding a message output by a changed component from the first message pattern, and to update the first message pattern to the second message pattern.

9 Claims, 23 Drawing Sheets

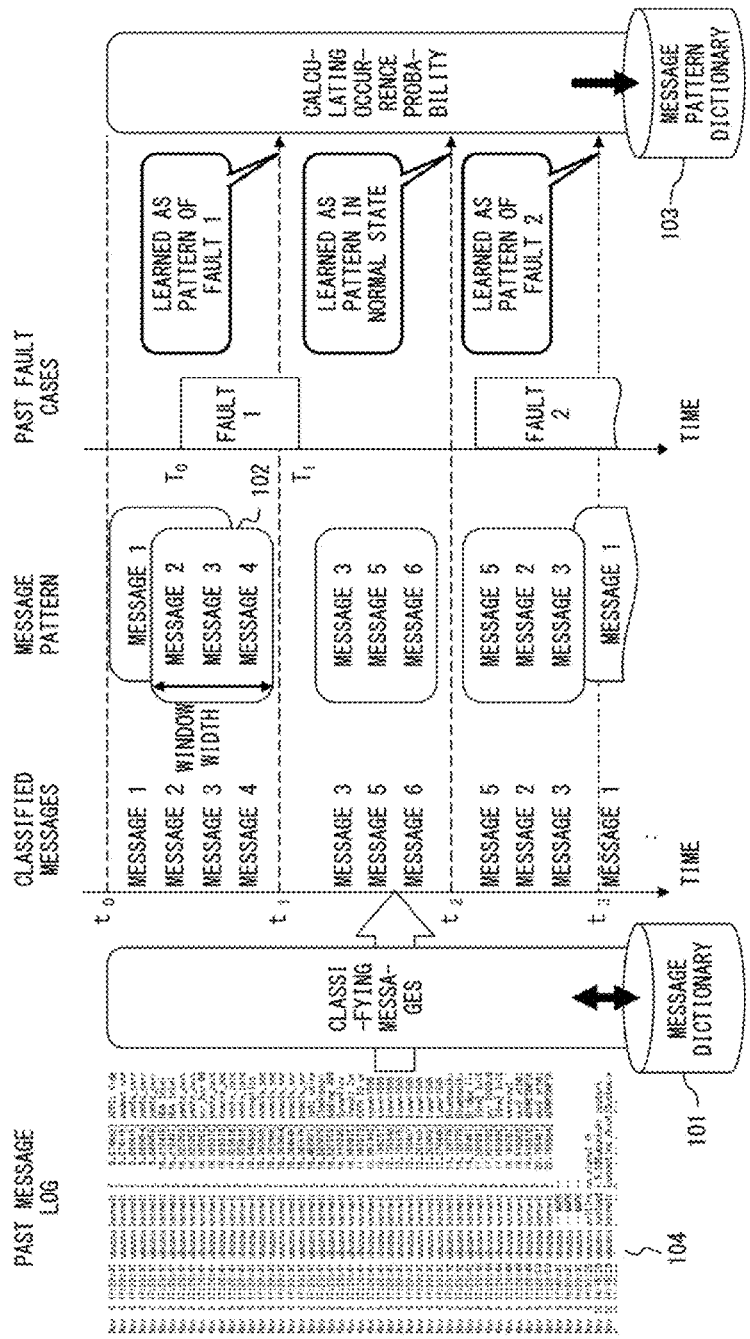
F I G. 1

MESSAGE PATTERN OF FAULT 1

```
<probability events="[ 0, 2, 3, 4, 10, 18, 19, 21, 27, 36, 65, 15, 16, 118 ]" score=" 0.15625 "/>
<probability events="[ 0, 1, 2, 3, 4, 10, 18, 19, 21, 27, 30, 58, 64, 65, 82, 83, 109 ]" score=" 1.0 "/>
<probability events="[ 0, 1, 2, 3, 4, 10, 18, 19, 21, 27, 30, 64, 65, 82, 83, 109 ]" score=" 1.0 "/>
<probability events="[ 0, 1, 2, 3, 4, 10, 18, 19, 21, 27, 30, 64, 65, 82, 118 ]" score=" 1.0 "/>
<probability events="[ 0, 1, 2, 3, 4, 10, 18, 19, 21, 27, 64, 65, 118 ]" score=" 1.0 "/>
<probability events="[ 0, 1, 2, 3, 4, 10, 18, 19, 21, 27, 64, 65, 15, 118 ]" score=" 1.0 "/>
<probability events="[ 0, 1, 2, 3, 4, 10, 18, 19, 21, 27, 64, 65, 15, 118 ]" score=" 1.0 "/>
```

MESSAGE PATTERN OBSERVED WHEN FAULT 1 HAS OCCURRED

CO-OCCURRENCE PROBABILITY OF MESSAGE PATTERN AND FAULT 1

103

F I G. 2

```
[W3C EXTENDED LOG]
 02:19:42 192.168.01.02 GET /iisstart.asp 200
[MS IIS LOG]
 192.168.01.02, -, 2010/05/07, 11:19:42, W3SVC1, XXXXX, 192.168.01.01, 0, 411, 1461, 200, 0, GET, /iisstart.asp, -,
[NCSA FORMAT]
 192.168.01.02 - - [07/May/2010:11:19:42 +0900] "GET /iisstart.asp HTTP/1.1" 200 1461
```

FIG. 4

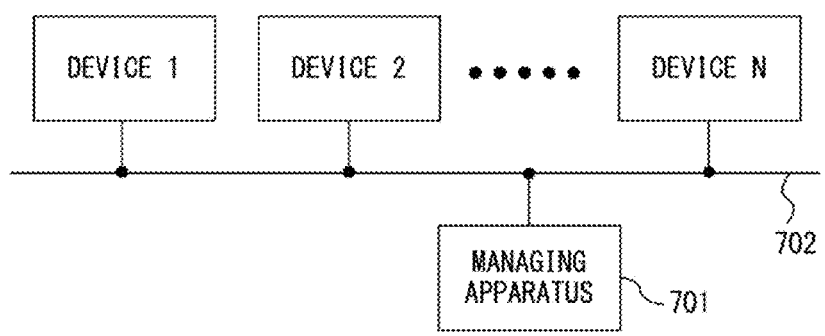
F I G. 7

MESSAGE PATTERN TABLE

| MESSAGE PATTERN | MESSAGE ID | | | | | |
|---|---|---|---|---|---|---|
| | m | m−1 | ... | 3 | 2 | 1 |
| PATTERN 1 | 0 | 0 | ... | 0 | 0 | 1 |
| PATTERN 2 | 0 | 0 | ... | 0 | 1 | 0 |
| PATTERN 3 | 0 | 0 | ... | 0 | 1 | 1 |
| ⋮ | ⋮ | ⋮ | ⋮ | ⋮ | ⋮ | ⋮ |
| PATTERN i | 1 | 0 | ... | 1 | 0 | 1 |
| ⋮ | ⋮ | ⋮ | ⋮ | ⋮ | ⋮ | ⋮ |
| PATTERN $(2^m-1)$ | 1 | 1 | ... | 1 | 1 | 1 |

FIG. 9

CO-OCCURRENCE PROBABILITY TABLE

| MESSAGE PATTERN | TOTAL NUMBER OF DETECTION TIMES | NUMBER OF DETECTION TIMES | | | | | |
|---|---|---|---|---|---|---|---|
| | | FAULT 1 | FAULT 2 | ... | FAULT j | ... | FAULT n |
| PATTERN 1 | 2 | 0 | 0 | ... | 0 | ... | 0 |
| PATTERN 2 | 0 | 0 | 0 | ... | 0 | ... | 0 |
| PATTERN 3 | 89 | 0 | 80 | ... | 0 | ... | 0 |
| ⋮ | ⋮ | ⋮ | ⋮ | ⋮ | ⋮ | ⋮ | ⋮ |
| PATTERN i | $E_i$ | 8 | 0 | ... | $C_{ij}$ | ... | 0 |
| ⋮ | ⋮ | ⋮ | ⋮ | ⋮ | ⋮ | ⋮ | ⋮ |
| PATTERN $(2^m-1)$ | 0 | 0 | 0 | ... | 0 | ... | 0 |

1000

F I G. 10

MESSAGE TABLE 1100

| MESSAGE ID | REGISTERED MESSAGE | CI |
|---|---|---|
| 1 | example-svr10 snmpd[10823]: Connection from 127.0.0.1 REFUSED | Network |
| 2 | example-mail00 qmail: [ID 748625 mail.alert] 1230417000.454848 alert: cannot start: qmail-send is already running | App |
| 3 | example-mail10 sendmail[229952]: [ID 702911 mail.crit] My unqualified host name (example-mail10) unknown; sleeping for retry | Network |
| ... | ... | ... |
| l | example-mgr2-sv01 root: [ID 702911 local0.warning] RMC: XXX: WARNING: 1001: Memory : FreeMemory(324080) < Threshold Value(419430) | OS |
| ... | ... | ... |
| m | example-vpn02 fick_2[275281]: [ID 850609 local0.error] SSH: mgr: INFO: 9190: XXX MONITORING LINKAGE/xxxDB/api/xxdb/etc/timefile /xxx_timefile3_ftp.txt IS NORMALLY RUNNING | OS |

F I G. 1 1

F I G. 1 2

| COMPONENT ID | COMPONENT TYPE | COMPONENT NAME | DESCRIPTION | ADMINISTRATOR |
|---|---|---|---|---|
| 1 | Network | front-sw-01 | Layer Switch2960 | Tanaka |
| 2 | App | front-webserver-01 | webserver5.5.27 | Lee |
| 3 | Network | dmz-sw-01 | Extreme BD 12800 | Smith |
| 4 | OS | front-OS001-acc01 | OS-001 | Lee |
| 5 | OS | dmz-OS002-web01 | OS-002 | Smith |
| ... | ... | ... | ... | ... |

FAULT CASES 810

| 1301 | FAULT ID | 1 | | |
| --- | --- | --- | --- | --- |
| 1302 | FAULT ID | 2 | | |
| | FAULT ID | j | | |
| 1303 | FAULT TYPE | NETWORK CARD PROBLEM | | |
| | FAULT ID | n | | |
| | FAULT TYPE | HDD MALFUNCTION | | |
| 1304 | INDIVIDUAL CASE | OCCURRENCE TIME | END TIME |
| | CASE 1 | 2010/05/15-18:05:15 | 2010/05/15-18:12:20 |
| | CASE 2 | 2010/05/15-20:42:02 | 2010/05/15-20:55:00 |
| | ... | ... | ... |
| | CASE k | 2010/05/18-23:55:21 | 2010/05/19-00:09:17 |

MESSAGE PATTERN TABLE

| MESSAGE PATTERN | MESSAGE ID | | | | | |
|---|---|---|---|---|---|---|
| | m | m-1 | ... | 3 | 2 | 1 |
| PATTERN 1 | 0 | 0 | ... | 0 | 0 | 1 |
| PATTERN 2 | 0 | 0 | ... | 0 | 1 | 0 |
| PATTERN 3 | 0 | 0 | ... | 0 | 1 | 1 |
| : | : | : | : | : | : | : |
| PATTERN ($2^m-1$) | 1 | 1 | ... | 1 | 1 | 1 |

⇒ PATTERN 2'  (900)

EXAMPLE OF CO-OCCURRENCE PROBABILITY TABLE

| MESSAGE PATTERN | TOTAL NUMBER OF DETECTION TIMES | NUMBER OF DETECTION TIMES | | | | |
|---|---|---|---|---|---|---|
| | | FAULT 1 | FAULT 2 | ... | FAULT j | ... | FAULT n |
| PATTERN 1 | 2 | 0 | 0 | ... | 0 | ... | 0 |
| PATTERN 2 | 2 | 0 | 0 | ... | 0 | ... | 0 |
| PATTERN 3 | 89 | 0 | 80 | ... | 0 | ... | 0 |
| : | : | : | : | : | : | : | : |
| PATTERN i | $E_i$ | 8 | 0 | ... | $C_{ij}$ | ... | 0 |
| : | : | : | : | : | : | : | : |
| PATTERN ($2^m-1$) | 0 | 0 | 0 | ... | 0 | ... | 0 |

⇒ PATTERN 2'  (1000)

F I G. 16

```
                                          p
PATTERN 1          0 0 1 0 1 0 1 1 0 [1] 0 0 1 0 1 1 0 1 0 1
PATTERN 2          0 0 1 0 1 0 1 1 0 [0] 0 0 1 0 1 1 0 1 0 1
MASK PATTERN       1 1 1 1 1 1 1 1 1 [0] 1 1 1 1 1 1 1 1 1 1

OPERATION RESULTS  0 0 1 0 1 0 1 1 0  0  0 0 1 0 1 1 0 1 0 1
```

F I G. 17

MANAGING APPARATUS, MANAGING METHOD

CROSS-REFERENCE TO RELATED APPLICATION

This application is based upon and claims the benefit of priority of the prior Japanese Patent Application No. 2010-275215, filed on Dec. 10, 2010, the entire contents of which are incorporated herein by reference.

FIELD

The embodiment discussed herein is related to a managing apparatus and a managing method, which are intended to manage a system including one or two or more information processing devices.

BACKGROUND

In recent years, a utilization form of ICT (Information and Communication Technology) called cloud computing has been known. Cloud computing is a utilization form of ICT, by which ICT resources on a network are used via a network.

ICT resources include various elements such as a network, a server and a storage, which are interconnected by a network, middleware running on a server, and the like.

In an environment for realizing cloud computing, namely, in a cloud environment, there are many systems having an identical or similar configuration in some cases. Moreover, in the cloud environment, a configuration of the ICT resources included in the cloud environment is dynamically changed by a replacement of hardware, an addition of a server, a version upgrade of an application, or the like. Accordingly, a heavy workload is imposed on the management of the cloud environment, such as fault detection or the like.

In relation to the above described technique, an apparatus for generating an anomalous state signal by collecting and processing warning message signals from a communication network is known.

Additionally, a fault detection system that has a peripheral device fault pattern file and a node device fault pattern file, to which a characteristic of a fault MSG (message) is preregistered, and determines a peripheral device fault MSG or the like by making a comparison between an MSG and an individual pattern of the pattern file is known.

Furthermore, a fault monitoring system for registering maintenance information of a newly connected device to a fault dictionary upon detection of the newly connected device, and for determining a fault of the newly connected device if a notified log message is registered to the fault dictionary is known.

Still further, a relay server for adding, to shared resources information, message information about a notification message for notifying that information or the like of a relay group or the like has been changed, and for automatically deleting the message information when a predetermined duration elapses after the message information about the notification message is added to the shared resources information is known.

[Patent Document 1] Japanese Laid-open Patent Publication No. 08-307524

[Patent Document 2] Japanese Laid-open Patent Publication No. 2001-292143

[Patent Document 3] Japanese Laid-open Patent Publication No. 2005-184500

[Patent Document 4] Japanese Laid-open Patent Publication No. 2009-159129

SUMMARY

According to an aspect of the embodiment, a managing apparatus is an apparatus for managing an information processing system including a plurality of components, and includes the following configuration.

A storing unit is a storing device configured to store fault co-occurrence information storing the number of detection times that a first message pattern indicating a message group including one or two or more messages received from the information processing system in a predetermined duration is detected when a fault has occurred in the information processing system.

A determining unit detects the first message pattern from the one or two or more messages received from the information processing system in the predetermined duration. In this case, the determining unit reads the number of detection times from the fault co-occurrence information stored in the storing unit, calculates a co-occurrence probability of the fault and the first message pattern based on the number of detection times, and determines that the fault has occurred if the co-occurrence probability is equal to or higher than a threshold value.

An updating unit detects that a component has been changed. In this case, the updating unit creates a second message pattern indicating a message group obtained by excluding a message output by the changed component from the first message pattern, and updates the first message pattern stored in the fault co-occurrence information to the second message pattern.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is an explanatory view of message pattern learning;

FIG. 2 illustrates part of a message pattern dictionary created from messages detected when a fault 1 has occurred;

FIG. 4 exemplifies that a Web server log totally varies depending on a setting;

FIG. 7 illustrates a configuration example of an information processing system using a managing apparatus according to an embodiment 2;

FIG. 9 illustrates an example of a message pattern table in the embodiment 2;

FIG. 10 illustrates an example of a co-occurrence probability table in the embodiment 2;

FIG. 11 illustrates an example of a message table in the embodiment 2;

FIG. 12 illustrates an example of configuration information in the embodiment 2;

FIG. 13 illustrates an example of fault cases in the embodiment 2;

FIG. 16 is an explanatory view of the outline of the process executed by the message pattern updating unit in the embodiment 2;

FIG. 17 is an explanatory view of an example of a method for detecting message patterns to be merged in the embodiment 2;

DESCRIPTION OF EMBODIMENTS

Figure 3:
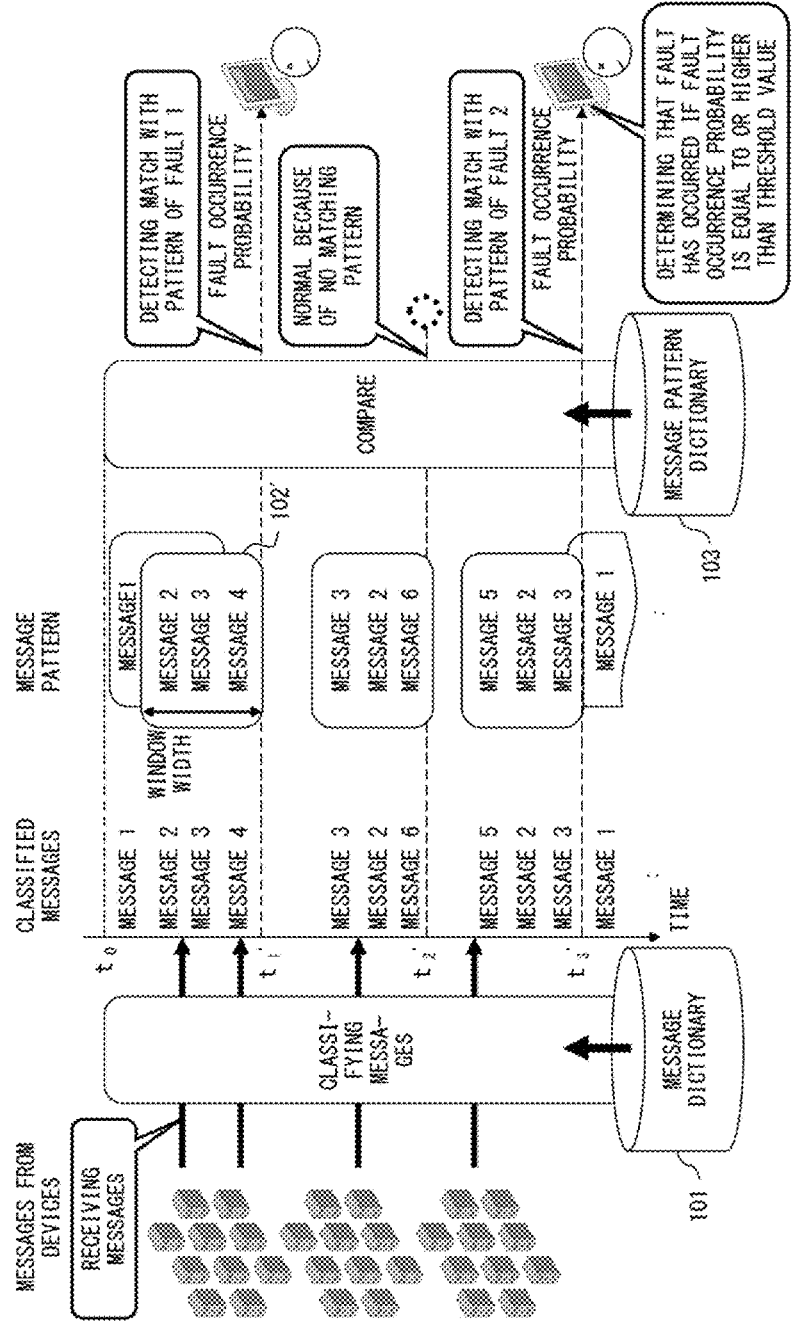
FIG. 3 is an explanatory view of an outline of a process for detecting a fault occurrence based on a message pattern.

FIGS. 1 to 3 are explanatory views of a managing apparatus for performing fault detection by using a message pattern.

FIG. 1 is an explanatory view of message pattern learning. If performing fault detection by using a message pattern, the managing apparatus needs to learn a message pattern that characterizes a fault based on a log of past fault cases.

The managing apparatus classifies messages stored in a message dictionary 101 among messages stored in a log of past messages output from devices under a cloud environment into messages that have occurred in each predetermined duration. FIG. 1 exemplifies that messages 1, 2, 3 and 4 that have occurred from a time t0 to a time t1 are classified from the messages stored in the message log.

The managing apparatus generates a message pattern by collecting classified messages that have occurred in each predetermined duration. This predetermined duration is referred to as a window width. FIG. 1 exemplifies message patterns such as a message pattern 102 including the messages 2, 3 and 4 in the window width.

In the meantime, the managing apparatus may know that a fault has occurred at a particular time based on past fault cases.

In the example of FIG. 1, messages included in the message pattern 102 occur in an occurrence time from T0 to T1 of a fault 1. In this case, the managing apparatus stores the message pattern 102 in a message pattern dictionary 103 as a message pattern that characterizes the fault 1. At this time, the managing apparatus calculates a fault occurrence probability that the fault 1 occurs when the messages included in the message pattern 102 have occurred, and stores the calculated probability in the message pattern dictionary 103.

FIG. 2 illustrates an example of message patterns that are obtained as a result of learning performed as described above and stored in the message pattern dictionary 103. FIG. 2 illustrates some of message patterns created from messages detected when the fault 1 has occurred.

Each of the message patterns illustrated in FIG. 2 is represented with a <probability> tag. The <probability> tag includes an events attribute indicating a message pattern, and a score attribute indicating an occurrence probability of a fault. The events attribute is information including identification information of messages detected at a time when a fault has occurred, for example, the messages 1, 2, 3 and 4 illustrated in FIG. 1. The score attribute is information indicating an occurrence probability of a fault when a message pattern indicated by the events attribute is observed, namely, a co-occurrence probability of the message pattern and the fault.

FIG. 3 is an explanatory view of an outline of a process for detecting a fault occurrence based on a message pattern.

The managing apparatus classifies messages stored in the message dictionary 101 among messages received from devices under a cloud environment into messages output in each predetermined duration. FIG. 3 exemplifies that the messages 1, 2, 3 and 4, which have been received from a time t'0 to a time t'1, are classified from the messages received from the devices under the cloud environment.

The managing apparatus generates a message pattern by collecting classified messages for each window width. FIG. 3 exemplifies message patterns such as a message pattern 102' including the messages 2, 3 and 4.

The managing apparatus makes a comparison between the generated message pattern and message patterns stored in the message pattern dictionary 103, for example, the message patterns indicated by the events attribute illustrated in FIG. 2. Upon detection of a message pattern that matches any of the message patterns stored in the message pattern dictionary 103, the managing apparatus references the fault occurrence probability stored in the message pattern dictionary 103, for example, the fault occurrence probability indicated by the score attribute illustrated in FIG. 2 along with the detected message pattern. The managing apparatus may determine that the fault has occurred if the fault occurrence probability is equal to or higher than a threshold value.

Alternatively, the managing apparatus may determine that the fault has not occurred, namely, the state of the system is normal if the message pattern that matches the message pattern stored in the message pattern dictionary 103 is not detected, or if the fault occurrence probability is lower than the threshold value.

However, in the devices under the cloud environment, there are a plurality of systems having an identical or similar configuration, such as hardware, a server, an application and the like. The identical or similar configuration is frequently changed in a life cycle. For example, a configuration of an device is changed from day to day by a replacement of hardware, a version upgrade of an application, or the like. Moreover, a new server is added or a server is removed under the cloud environment.

Additionally, if a conventionally output message is not output, for example, due to a replacement of an device, a setting change of an application, or the like, a message pattern is partially lacking compared with a learned message pattern. Moreover, if content of a message is different from a conventional one although a replaced device or an application the setting of which has been changed outputs the message as is conventionally done, a message pattern becomes partially different from the conventional one.

FIG. 4 exemplifies that a Web server log becomes totally different depending on settings.

FIG. 4 illustrates the case where the Web server log is output in a W3C (World Wide Web Consortium) extended log format, a case where the Web server log is output in an MS (Microsoft) HS log format, and a case where the Web server log is output in an NCSA (National Center for Supercomputing Applications) format.

As described above, if the configuration or the setting of an device under the cloud environment is changed, the fault occurrence detection illustrated in FIG. 3 may not be performed by using the message patterns learned in FIG. 1.

Figure 5:
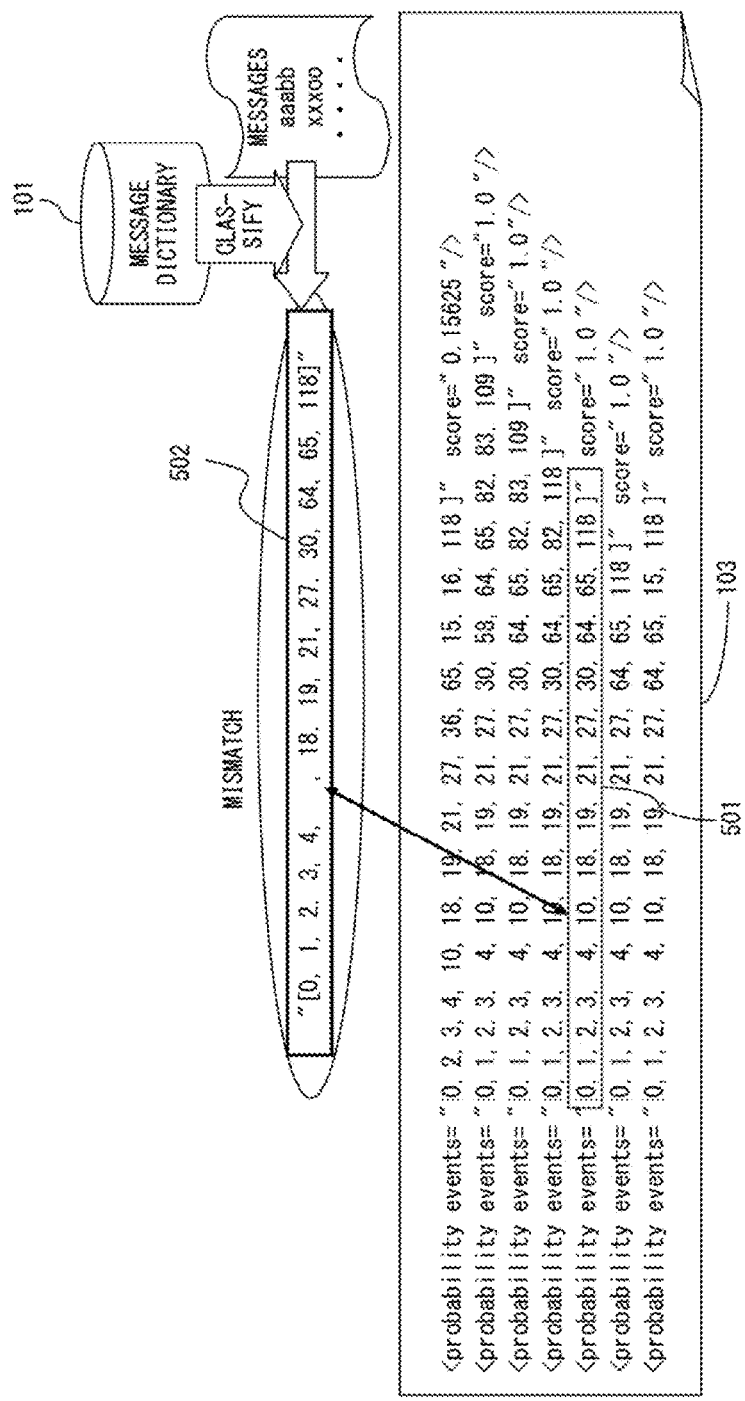
FIG. 5 illustrates an example of a case where a message pattern obtained from an device does not match a learned message pattern because a configuration included in an information processing system or a setting of the configuration is changed.

FIG. 5 illustrates an example of a case where a message pattern obtained from devices does not match a learned message pattern because the configuration of an device or the setting of a configuration under the cloud environment is changed.

Messages received from the devices are classified into messages output in each predetermined duration as described with reference to FIG. 3. Then, the managing apparatus obtains, for example, a message pattern 502. However, a conventionally included message ID "10" is not output in this message pattern because the configuration or the setting of the configuration has been changed.

In this case, the message pattern 502 does not match the message pattern 501 stored in the message pattern dictionary 103. As a result, a conventionally detectable problem may not be detected in some cases. Accordingly, learning needs to be newly performed after discarding the learned message patterns and fault occurrence probabilities, which are stored in the message pattern dictionary 103.

Detection of a message pattern similar to a learned message pattern stored in the message pattern dictionary 103 by obtaining a correlation between message patterns, for example, with a vector distance between the message patterns is also considered. In this case, however, it becomes difficult to statistically calculate the fault occurrence probability of the similar message pattern.

Embodiments are described below with reference to FIGS. 6 to 23. The embodiment described below is merely an example, and does not intend to exclude various modifications and applications of the technique, which are not clearly demonstrated below. Namely, this embodiment may be implemented by being variously modified, such as by combining the embodiments within a scope that does not depart from the gist of this embodiment.

Embodiment 1

Figure 6:
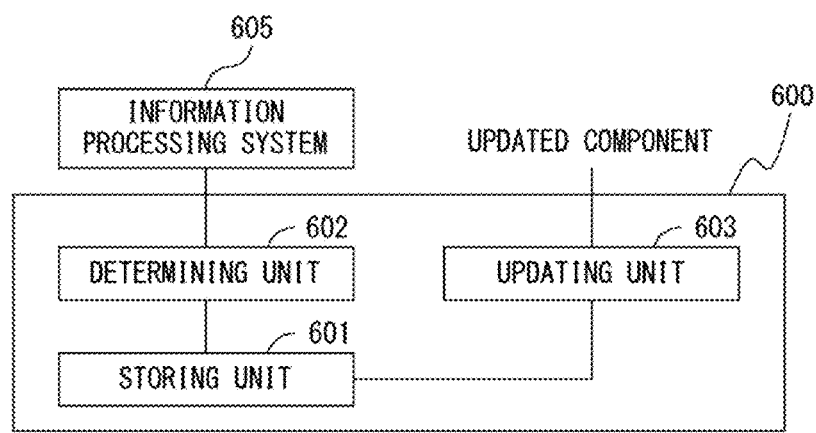
FIG. 6 is an explanatory view of a managing apparatus according to an embodiment 1.

FIG. 6 is an explanatory view of a managing apparatus 600 according to this embodiment.

The managing apparatus 600 illustrated in FIG. 6 includes a storing unit 601, a determining unit 602 and an updating unit 603. The managing apparatus 600 is communicatively connected to an information processing system 605 to be management via a network or a dedicated line.

The information processing system 605 is a system to be managed by the managing apparatus 600 according to this embodiment. The information processing system 605 is, for example, an information processing system that provides a cloud environment. The information processing system 605 includes one or two or more devices. The devices are communicatively connected via a network or the like. The devices include information processing devices such as a server, a SAN (Storage Area Network), a NAS (Network Attached Storage), a CAS (Content Aware Storage) and the like. In this embodiment, an element, such as an device, hardware included in an device, software running on an device or hardware included in an device, or the like, which may be an entity that outputs a message, is referred to as a component.

The storing unit 601 is a storage device for storing fault co-occurrence information including the number of times that a first message pattern indicating a message group including one or two or more messages received from the information processing system 605 in a predetermined duration is detected when a fault has occurred in the information processing system 605. The storing unit 601 may be a volatile storage device such as a RAM (Random Access Memory) or the like, or may be a nonvolatile storage device such as a magnetic disk device or the like.

The determining unit 602 detects the first message pattern from one or two or more messages received from the information processing system 605 in the predetermined duration. In this case, the determining unit 602 reads the number of detection times from the fault co-occurrence information stored in the storage unit 601, and calculates a co-occurrence probability of the fault and the first message pattern based on the read number of detection times. Then, the determining unit 602 determines that the fault has occurred if the co-occurrence probability is equal to or higher than a threshold value.

The updating unit 603 detects that a component included in the information processing system 605 has been changed. In this case, the updating unit 603 creates a second message pattern indicating a message group obtained by excluding a message output by the changed component from the first message pattern, and updates the first message pattern stored in the fault co-occurrence information to the second message pattern.

The determining unit 602 and the updating unit 603 may be realized by causing a CPU (Central Processing Unit) included in an information processing device to execute a predetermined program.

In the above described configuration, the updating unit 603 updates the first message pattern stored in the fault co-occurrence information to the second message pattern obtained by excluding the message output by the changed component from the first message pattern, if the component included in the information processing system 605 has been changed.

As a result, the determining unit 602 may read the number of detection times from the fault co-occurrence information stored in the storage unit 601 even upon detecting the second message pattern from the information processing system 605, and may calculate a co-occurrence probability of the fault and the second message pattern based on the read number of times. Then, the determining unit 602 determines that the fault has occurred if the co-occurrence probability is equal to or higher than the threshold value.

Consequently, even if the information processing system 605 does not output the first message pattern output so far because a component included in the information processing system 605 has been changed, a co-occurrence probability may be obtained by using the fault co-occurrence information, and a fault of the information processing system 605 may be detected. As a result, a workload imposed on the fault management for the information processing system 605 may be lightened.

Embodiment 2

FIG. 7 illustrates a configuration example of an information processing system 700 using a managing apparatus 701 according to this embodiment. N used in the following description and the drawings is assumed to be an integer equal to or larger than 1.

The information processing system 700 illustrated in FIG. 7 is a system including an device 1, an device 2, ..., an device N, and a managing apparatus 701. The information processing system 700 may provide a cloud environment. The device 1, the device 2, ..., the device N and the managing apparatus 701 are communicatively connected via a network 702.

The device 1, the device 2, ..., the device N may respectively include an information processing device such as a server, a SAN, a NAS, a CAS or the like.

The device 1, the device 2, ..., the device N, and hardware respectively included in the device 1, the device 2, ..., the device N output a message to the managing apparatus 701 as needed. "The message output by hardware" may be considered as a message output by a program that controls hardware and may be regarded as being integral with the hardware. Also an application running on the device 1, the device 2, ..., the device N, and an application running on the hardware respectively included in the application 1, the application 1, ... the application N output a message to the managing apparatus 701 as needed.

In this embodiment, an element, such as an device included in the information processing system 700, hardware included in an device, software running on hardware included in an device, or other elements, which may be an entity that outputs a message, is referred to as a component.

Figure 22:
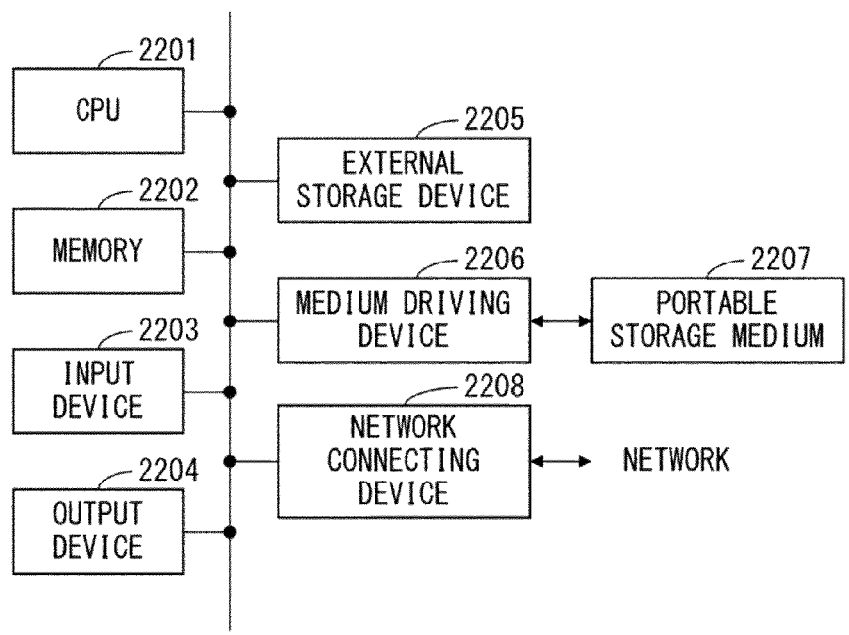
FIG. 22 illustrates a configuration example of the managing apparatus according to the embodiment 2.

The managing apparatus 701 may be implemented by using a general information processing device as illustrated in FIG. 22. In this case, the managing apparatus according to this embodiment may be implemented by causing a CPU 2201 included in the managing apparatus 701 to execute a predetermined program.

The managing apparatus 701 collects messages output from the components included in the information processing system 700. Then, the managing apparatus 701 manages the state of the information processing system 700, for example, by determining whether or not a fault has occurred based on the collected messages.

Figure 8:
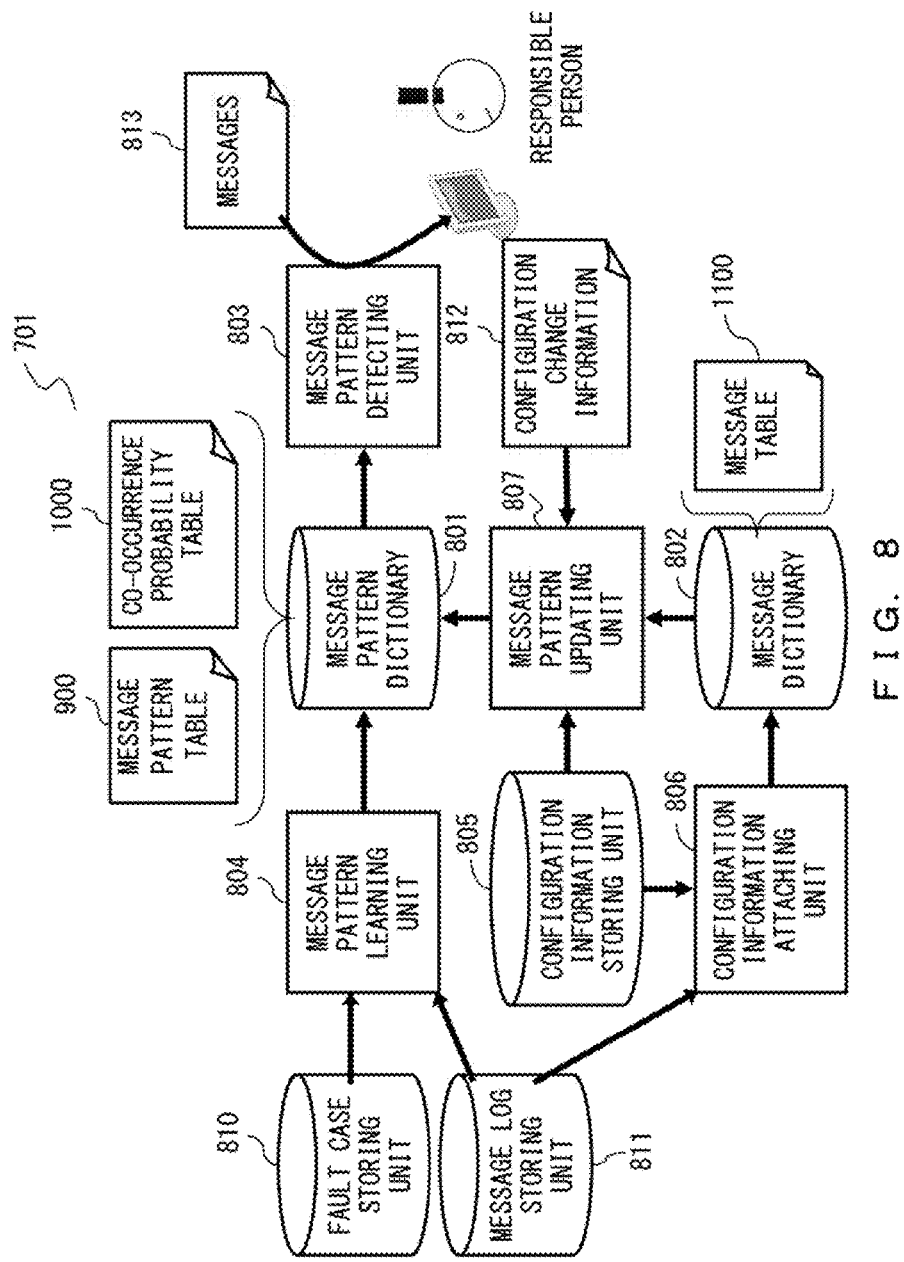
FIG. 8 illustrates a configuration example of the managing apparatus according to the embodiment 2.

FIG. 8 illustrates a configuration example of the managing apparatus 701 according to this embodiment.

The managing apparatus 701 includes a message pattern dictionary 801, a message dictionary 802 and a message pattern detecting unit 803. Moreover, the managing apparatus 701 may include a message pattern learning unit 804. The managing apparatus 701 may also include a configuration information storing unit 805, a configuration information attaching unit 806 and a message pattern updating unit 807.

The message pattern dictionary 801 is a storage device for storing a message pattern table 900 and a co-occurrence probability table 1000. A message pattern means a message group including one or two or more messages. In this embodiment, a message group including messages output from the information processing system 700 to be managed in a predetermined duration is used as a message pattern. For the message pattern in this embodiment, the order of output messages does not matter. For example, a message pattern including the messages 1, 2 and 3 output in this order, and a message pattern including the messages 3, 2 and 1 output in this order are handled as identical message patterns.

The message pattern table 900 is information including a message pattern that is extracted from a past message log and past fault cases and characterizes a fault. The co-occurrence probability table 1000 is information including a fault occurrence frequency for each message pattern. The message pattern table 900 and the co-occurrence probability table 1000 will be described later respectively with reference to examples of FIGS. 9 and 10.

The message dictionary 802 is a storage device for storing a message table 1100. The message table 1100 is information including messages to be managed, namely, messages desired to be extracted as a message pattern. The message table 1100 will be described later with reference to an example of FIG. 11.

The message pattern detecting unit 803 collects messages 813 output from the components included in the information processing system 700. The message pattern detecting unit 803 classifies one or two or more messages 813 output in a predetermined duration into messages to be managed and messages other than the messages to be managed for each predetermined duration. For example, the message pattern detecting unit 803 may determine a message 813 as a message to be managed if the message 813 matches any of the messages stored in the message table 1100. Moreover, the message pattern detecting unit 803 creates a message pattern by classifying the messages to be managed into one message group for each window width.

The message pattern detecting unit 803 calculates a co-occurrence probability of a fault for each message pattern based on the co-occurrence probability table 1000. Then, the message pattern detecting unit 803 detects whether or not a fault has occurred based on the calculated co-occurrence probability of the fault. For example, if the co-occurrence probability of the fault exceeds a threshold value, the message pattern detecting unit 803 determines that the fault has occurred.

The message pattern learning unit 804 classifies messages stored in the message dictionary 802 among messages stored in a message log within the message log storing unit 811 into messages that have occurred in each predetermined duration. Then, the message pattern learning unit 804 generates a message pattern by collecting the classified messages for each window width. The message pattern learning unit 804 stores the generated message pattern in the message pattern table 900.

Additionally, the message pattern learning unit 804 counts the number of detection times that the generated message pattern is detected when a fault has occurred based on fault cases stored in the fault case storing unit 810, and stores the counted number in the co-occurrence probability table 1000.

The configuration information storing unit 805 is a storage device for storing information about components included in the information processing system 700, namely, configuration information.

The configuration information attaching unit 806 identifies a component at a transmission source of a message stored in the message dictionary 802 based on the configuration information stored in the configuration information storing unit 805, and stores the identified component in the message table 1100 by associating the component with the message.

The message pattern updating unit 807 receives configuration change information 812 including information about a changed component. In this case, the message pattern updating unit 807 generates a new message pattern table 900' (not illustrated) obtained by deleting the message transmitted by the changed component at a transmission source based on the message pattern stored in the message pattern table 900. Moreover, the message pattern updating unit 807 generates a co-occurrence probability table 1000' (not illustrated) for the new message pattern table 900'.

The fault case storing unit 810 is a storage device for storing past fault cases that occurred in the components included in the information processing system 700. The message log storing unit 811 is a storage device for storing messages output from the components included in the information processing system 700 as a log.

FIG. 9 illustrates an example of the message pattern table 900 in this embodiment. i and m, which are used in the following description and the drawings, are assumed to be an integer equal to or larger than 1.

The message pattern table 900 is a table for storing a bit string that indicates whether or not there is a message included in a message pattern for each message pattern. This bit string has a bit width equivalent to the number of message IDs. If the bit is "0", this indicates that the message indicated by the message ID corresponding to the bit is not included in the message pattern. Alternatively, if the bit is "1", this indicates that the message indicated by the message ID corresponding to the bit is included in the message pattern.

For example, a bit corresponding to a message ID "1" is set to "1" in the pattern 1. This indicates that the message having the message ID "1" is included in the message pattern of the pattern 1.

Similarly, bits corresponding to the message IDs "1" and "2" are set to "1" in the pattern 3. This indicates that messages respectively having the message IDs "1" and "2" are included in the message pattern of the pattern 3.

FIG. 10 illustrates an example of the co-occurrence probability table 1000 in this embodiment. j used in the following description and the drawings is assumed to be an integer equal to or larger than 1.

The co-occurrence probability table 1000 is a table including the total number of detection times and the number of detection times for each massage pattern. The total number of detection times is the total of the numbers of times that a corresponding message pattern is detected when a fault 1 to a fault j have occurred. The number of detection times is the number of times that a message pattern is detected for a fault when the fault has occurred.

For example, according to the co-occurrence probability table 1000 illustrated in FIG. 10, the total number of detection times of the message pattern of a pattern i is $E_i$. Moreover, the number of detection times that the message pattern of the pattern i is detected when the fault j has occurred is $C_{ij}$. Accordingly, the co-occurrence probability of the message pattern of the pattern i and the fault j may be obtained with $C_{ij}/E_i$.

FIG. 11 illustrates an example of the message table 1100 in this embodiment.

The message table 1100 is a table including a registered message and CI (Configuration Item) for each message ID.

The message ID is an ID of a message to be classified as a message included in a message pattern among messages output from the components included in the information processing system 700. Accordingly, even if a message different from a conventional one is output because a component included in the information processing system 605 has been changed, the message is not to be classified unless it is registered to the message table 1100 as a registered message. In this case, the message pattern detecting unit 803 may execute a process similar to that executed when a message is not output because a component has been removed or changed.

The CI is information indicating a component at the transmission source of a message among the components included in the information processing system 700.

FIG. 12 illustrates an example of configuration information 1200 in this embodiment.

The configuration information 1200 is information including a component ID, a component type, a component name, a description and an administrator.

The component ID is information for identifying a component included in the information processing system 700. The component type is information indicating the type of a component indicated by the component ID. For example, "Network" illustrated in FIG. 12 indicates software or hardware used in a network communication. The component name is information indicating the name of the component indicated by the component ID. The description is information about the component indicated by the component ID, for example, information including a software name, a version and the like. The administrator is information indicating an administrator for managing the component indicated by the component ID.

The configuration information 1200 may include at least one or more of the component ID, the component type and the component name as needed. Moreover, for example, as the CI illustrated in FIG. 11, any of the component ID, the component type and the component name, which are included in the configuration information 1200, may be used as needed.

FIG. 13 illustrates an example of fault cases in this embodiment.

In the fault case storing unit 810, one or two or more fault cases respectively including a fault ID, a fault type, and an individual case are stored. FIG. 13 illustrates a case where fault cases 1301, 1302, 1303 and 1304 are stored in the fault case storing unit 810.

The fault ID is identification information for identifying a fault case. The fault type is information indicating a fault type of a fault case, such as an HDD (Hard Disk Drive) malfunction, a network card problem or the like. The individual case is information including one or two or more cases of the same fault type. For example, the individual case of the fault case 1304 illustrated in FIG. 13 includes cases 1, 2, . . . , k. k indicates an integer equal to or larger than 3. Each of the cases may be defined with an occurrence time of a fault, and an end time of recovery of the fault.

Figure 14:
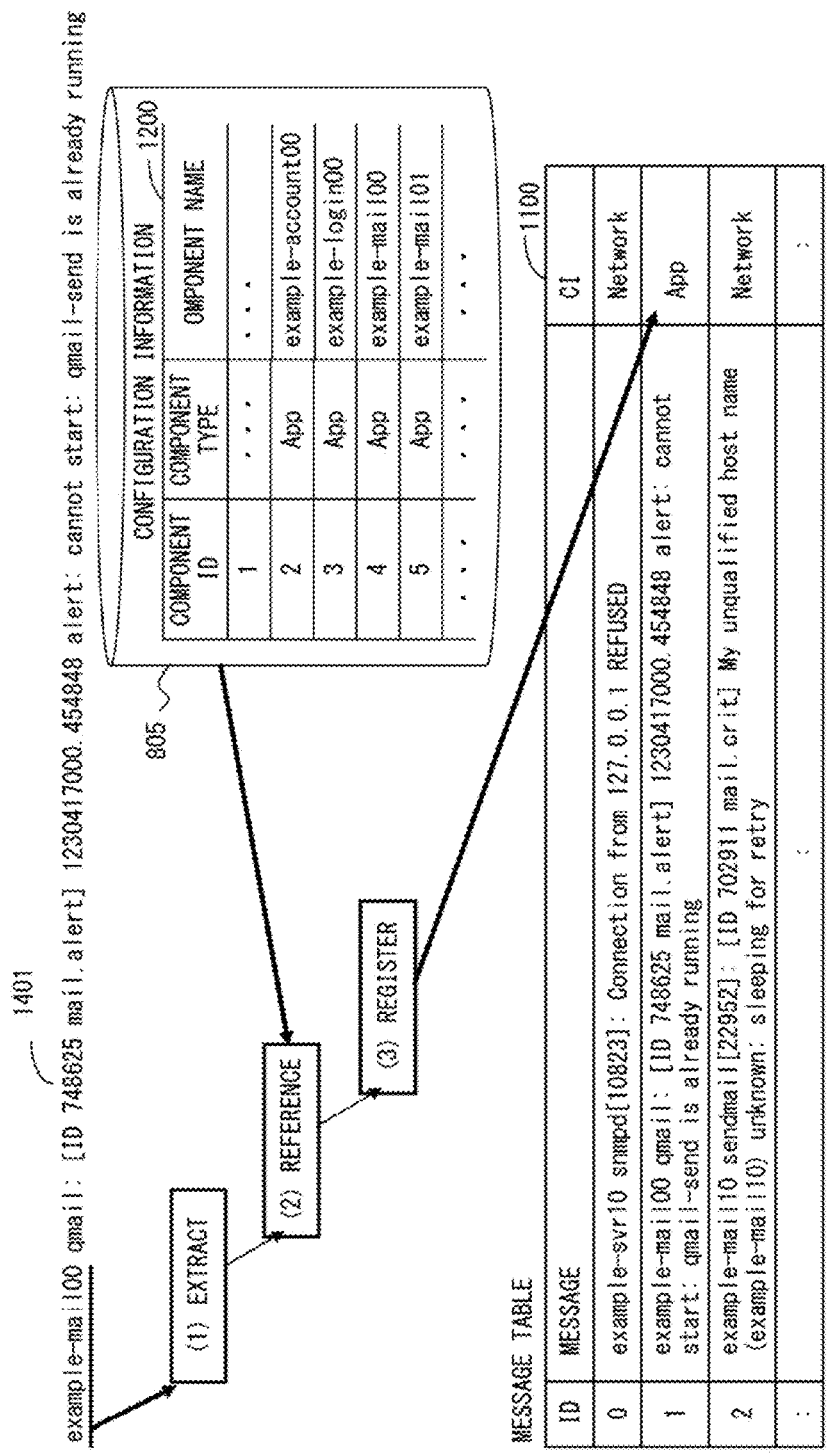
FIG. 14 is an explanatory view of an outline of a process executed by a configuration information attaching unit in the embodiment 2.

FIG. 14 is an explanatory view of an outline of a process executed by the configuration information attaching unit 806 in this embodiment. (1) to (3) illustrated in FIG. 14 respectively correspond to (1) to (3) described below.

(1) The configuration information attaching unit 806 reads a message 1401 from a message log stored in the message log storing unit 811. Then, the configuration information attaching unit 806 extracts a particular character string from a character string included in the message 1401. From which position in the message 1401 the particular character string is extracted may be predetermined according to, for example, the type of a message log.

(2) The configuration information attaching unit 806 references the configuration information 1200 stored in the configuration information storing unit 805, and obtains a component type of a component having a component name that matches the extracted particular character string. For instance, in the example of FIG. 14, a particular character string "example-mail00" is included in a message having the message ID "1". In the meantime, in the component name of the configuration information 1200, "example-mail00" is included. In this case, the configuration information attaching unit 806 obtains a component type "App" of the component name "example-mail00" from the configuration information 1200.

(3) The configuration information attaching unit 806 stores the component type obtained from the configuration information 1200 in the message table 1100 as a CI of the message. As a result, the message is associated with the CI indicating the component at the transmission source of the message and stored.

Figure 15:
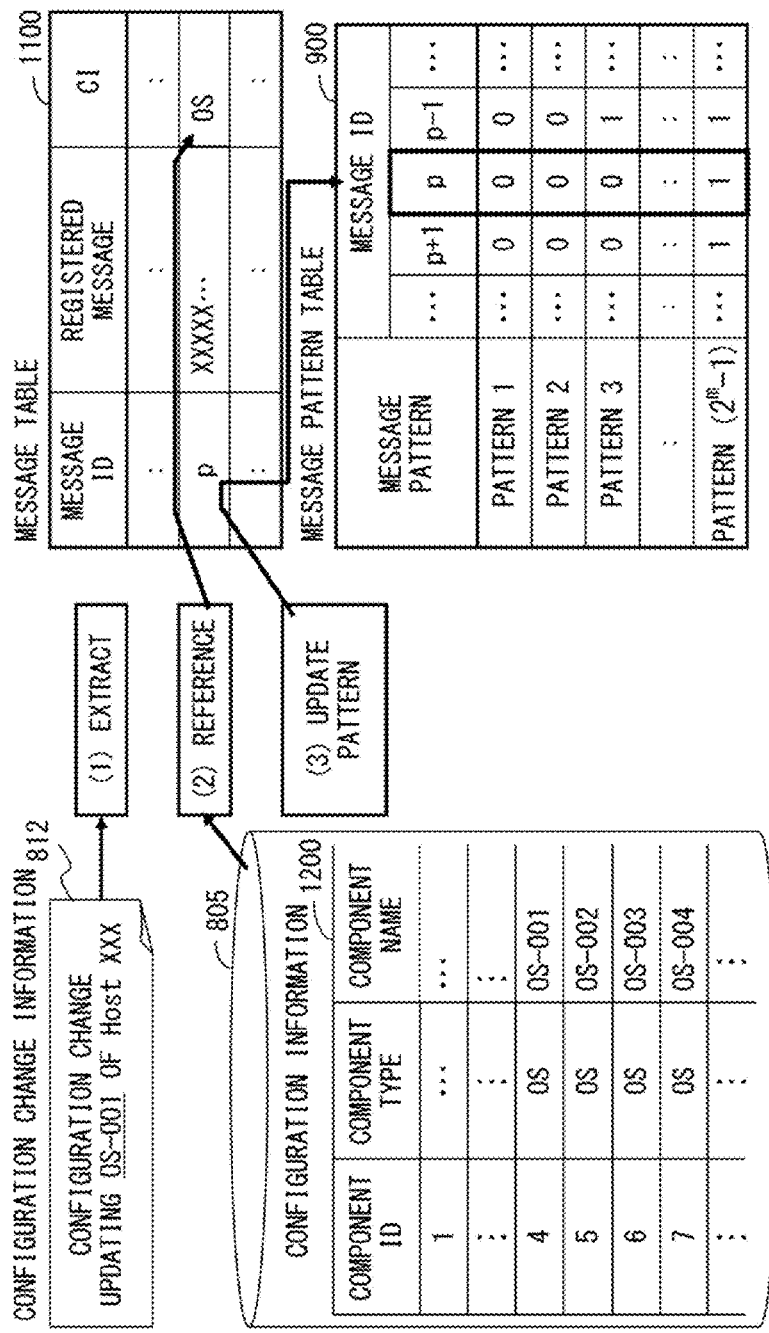
FIG. 15 is an explanatory view of an outline of a process executed by a message pattern updating unit in the embodiment 2.

FIGS. 15 and 16 are explanatory views of an outline of a process executed by the message pattern updating unit 807. (1) to (3) illustrated in FIG. 15 respectively correspond to (1) to (3) described below.

(1) Upon receipt of the configuration change information 812, the message pattern updating unit 807 extracts a component name of a changed component from a character string included in the configuration change information 812. FIG. 15 illustrates an example of a case where the message pattern updating unit 807 receives the configuration change information 812 indicating that OS-001 of Host XXX has been updated. In this case, the message pattern updating unit 807 extracts a character string "OS-001" indicating the component name from the character string included in the configuration change information 812. Whether or not the extracted character string is a character string indicating the component name may be determined by referencing the configuration information 1200 stored in the configuration information storing unit 805.

Note that the configuration change information 812 may include only the component name of a changed component. In this case, the configuration information attaching unit 806 may merely obtain the component name from the configuration information attaching unit 806.

(2) The message pattern updating unit 807 obtains a component type of a component having the component name that matches the component name extracted from the configuration change information 812 by referencing the configuration information 1200 stored in the configuration information storing unit 805. For instance, in the example of FIG. 15, the component type of the component having the component name "OS-001" is "OS".

The message pattern updating unit 807 identifies a message ID of a message having a CI that matches the component type extracted from the configuration information 1200 by referencing the message table 1100 stored in the message dictionary 802. In the example of FIG. 15, the message pattern updating unit 807 identifies a message ID "p" having the CI that matches the component type "OS".

(3) The message pattern updating unit 807 creates a message pattern table 900' by excluding a bit corresponding to the identified message ID from the message pattern table 900 stored in the message pattern dictionary 801. In the example of FIG. 15, the message pattern updating unit 807 creates the message pattern table 900' by excluding the bit corresponding to the message ID "p" from the message pattern table 900.

Here, for example, a case where the message output by the changed component is a message having the message ID "1" is considered.

FIG. 16 illustrates the message pattern table 900 in a case where the number of messages is m. In this case, a bit pattern is represented with a bit string having a bit width of m bits. Accordingly, the total number of message patterns results in $(2^m-1)$. If the bit indicating the message having the message ID "1" is excluded from the message pattern table 900, the bit pattern is represented with a bit string having a bit width of (m-1) bits. In this case, the total number of message patterns results in $(2^{(m-1)}-1)$.

Accordingly, if the bit corresponding to the message ID "1" is excluded from the message pattern table 900, duplicate message patterns like a message pattern having a pattern 2 and a message pattern having a pattern 3 in FIG. 16 are left.

Therefore, the message pattern updating unit 807 deletes the bit corresponding to the message ID "1" from the message pattern table 900, and the pattern 2 and the pattern 3 duplicate with the message of the pattern 2 are merged into a pattern 2'. With this merging, the message pattern table 900' is created.

Additionally, the message pattern updating unit 807 creates a co-occurrence probability table 1000' where the pattern 2 and the pattern 3 are merged into the pattern 2' in the co-occurrence probability table 1000 recorded in the message pattern dictionary 801.

In the example of the co-occurrence probability table 1000 illustrated in FIG. 16, the total number of detection times of the merged pattern 2' results in 91(=2+89) when the pattern 2 and the pattern 3 are merged. Moreover, when the pattern 2 and the pattern 3 are merged, the number of detection times of the pattern 2' results in 80(=0+80), for example, if the fault has occurred. Accordingly, the fault co-occurrence probability that the fault 2 occurs when the message pattern of the pattern 2' into which the pattern 2 and the pattern 3 are merged may be obtained as 80/(89+2).

FIG. 17 is an explanatory view of an example of a method for detecting identical message patterns obtained as a result of excluding a message output by a changed component from a message pattern, namely, message patterns to be merged in the message pattern table 900.

For example, as illustrated in FIG. 17, a bit string that represents a message pattern of the pattern 1, and a bit string that represents a message pattern of the pattern 2 as illustrated in FIG. 17 are considered. Assume that the message ID of the message output by the changed component, namely, the message to be deleted from the message pattern table 900 is p. In this case, the message pattern updating unit 807 creates a bit string where only a bit corresponding to the message ID "p" is "0" and other bits are "1". The created bit string is referred to as a mask pattern.

Then, the message pattern updating unit 807 calculates a logical AND between the mask pattern and the pattern 1, and a logical AND between the mask pattern and the pattern 2. If the logical AND between the mask pattern and the pattern 1 and that between the mask pattern and the pattern 2 match, the message pattern updating unit 807 determines that the pattern 1 and the pattern 2 are identical. In this case, the message pattern updating unit 807 determines that the pattern 1 and the pattern 2 are message patterns to be merged. The process for making a comparison between logical ANDs of a mask pattern in this way is referred to as a mask operation hereinafter.

Figure 18:
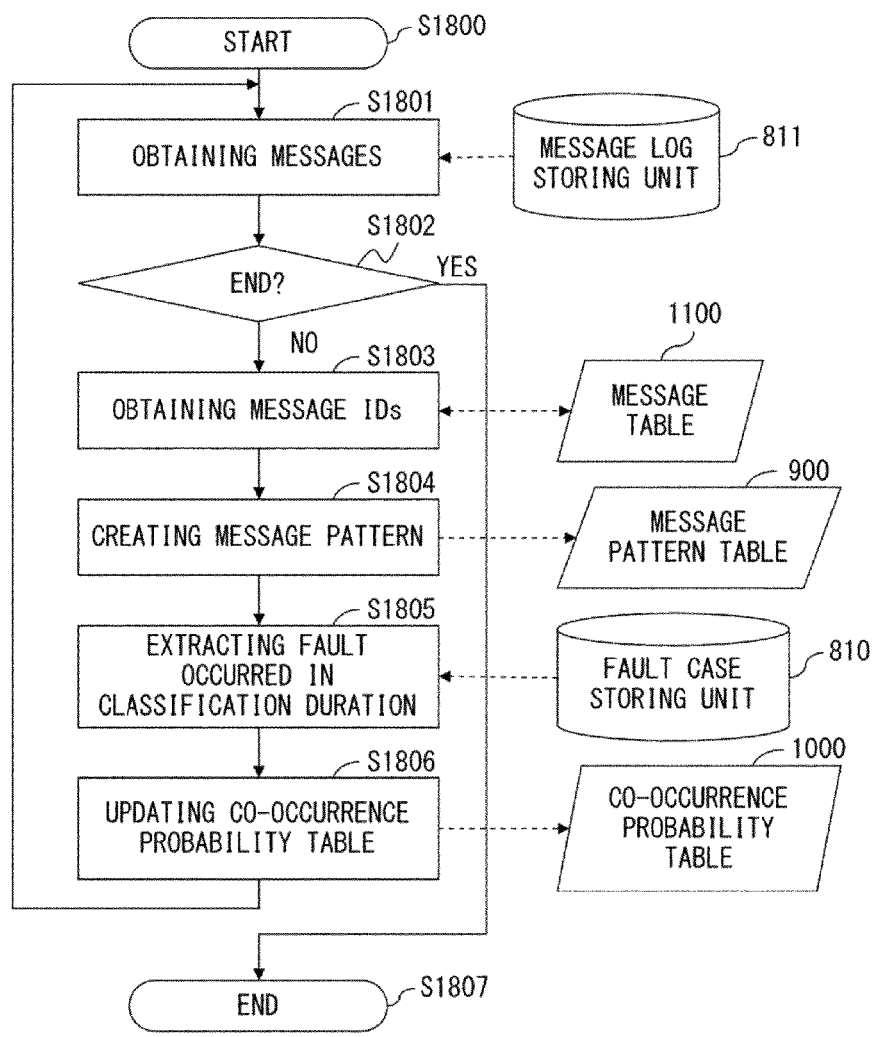
FIG. 18 is a flowchart illustrating a learning process executed by a message pattern learning unit in the embodiment 2.

FIG. 18 is a flowchart illustrating a learning process executed by the message pattern learning unit 804 in this embodiment. The learning process by the message pattern learning unit 804 may be executed independently of other processes such as a message pattern update process, a message pattern detection process, a configuration information attachment process and the like at a predetermined time or according to an instruction from a user.

In step S1801, the message pattern learning unit 804 references the message log storing unit 811. Then, the message pattern learning unit 804 obtains one or two or more messages output in a predetermined duration from a message log stored in the message log storing unit 811. The predetermined duration is referred to as a classification duration.

Upon detection of the end of the message log in step S1802 ("YES" in step S1802), the message pattern learning unit 804 terminates the learning process (step S1807).

Alternatively, if the end of the message log is not detected in step S1802 ("NO" in step S1802), the flow goes to step S1803. In this case, the message pattern learning unit 804 obtains the message ID of each message obtained in step S1801 by referencing the message table 1100 stored in the message dictionary 802 (step S1803).

If a message that is not stored in the message table 1100 is included in the messages obtained in step S1801, the message pattern learning unit 804 stores the message that is not stored in the message table 1100, in the message table 1100 along with a new message ID.

In step S1804, the message pattern learning unit 804 creates a bit string that represents the message pattern, and stores the created bit string in the message pattern table 900 as a bit pattern. The message pattern represented by the created bit string is hereinafter referred to as a target message pattern.

For example, a bit string that represents the target message pattern may be represented with a bit string having a width of bits the number of which is the same as the number of messages stored in the message table 1100 as illustrated in FIG. 9. The bit string that represents the target message pattern is a bit string where a bit corresponding to a message included in the target message pattern is set to "1" and other bits are set to "0". The message pattern learning unit 804 creates a bit string where the bit corresponding to the message of the message ID identified in step S1803 is set to "1" and the other bits are set to "0", and stores the created bit string in the message pattern table 900 as a bit pattern.

However, if the same message pattern as that created in step S1804 is already stored in the message pattern table 900, the message pattern learning unit 804 does not store the target message pattern in the message pattern table 900.

In step S1805, the message pattern learning unit 804 references fault cases stored in the fault case storing unit 810, and extracts cases that have occurred in a classification duration. For example, the message pattern learning unit 804 references an occurrence time and an end time of each case included in the individual case of a fault case, and extracts a fault case including a case having an occurrence duration that is represented with the occurrence time and the end time and included partially or entirely in the classification duration as a fault that has occurred in the classification duration.

In step S1806, the message pattern learning unit 804 references the co-occurrence probability table 1000, adds the umber of detection times, which corresponds to the target message pattern, for each fault extracted in step S1805, and also updates the total number of detection times.

For example, if the target message pattern is a pattern i and the fault extracted in step S1805 is "fault j", the message pattern learning unit 804 references the co-occurrence probability table 1000, and increments, by 1, the number of detection times "Cij" of the "pattern i" when the "fault j" has occurred. The message pattern learning unit 804 also increments, by 1, the total number "Ei" of detection times of the "pattern i".

Upon termination of the above described process, the flow goes to step S1801. Then, the message pattern learning unit 804 obtains one or two or more messages output in the next classification duration from the message log stored in the message log storing unit 811. Then, the message pattern learning unit 804 executes the processes in steps S1802 to S1806.

Figure 19:
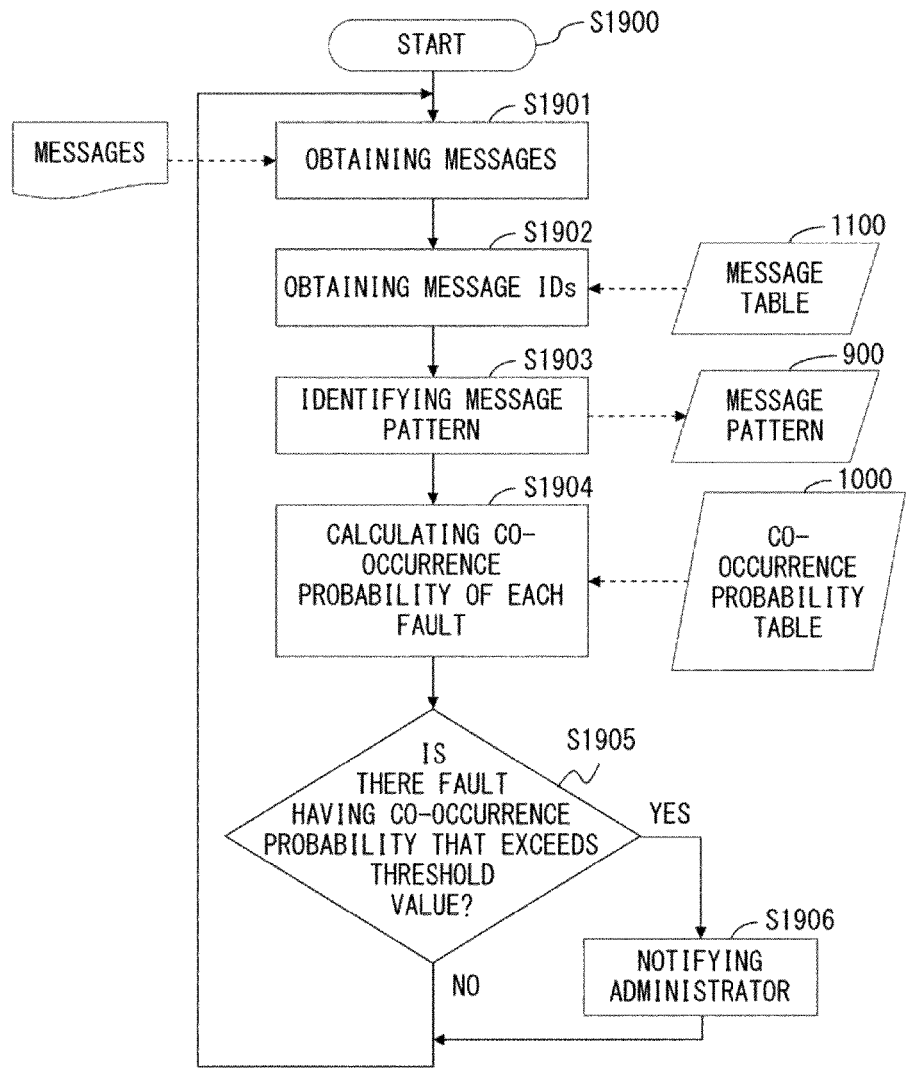
FIG. 19 is a flowchart illustrating a message pattern detection process executed by a message pattern detecting unit in the embodiment 2.

FIG. 19 is a flowchart illustrating a message pattern detection process executed by the message pattern detecting unit 803 in this embodiment. The message pattern detection process by the message pattern detecting unit 803 may be executed independently of other processes such as the learning process, the message pattern update process, the configuration information attachment process and the like.

In step S1901, the message pattern detecting unit 803 obtains messages output from the components included in the information processing system 700 in the classification duration.

In step S1902, the message pattern detecting unit 803 references the message table 1100 stored in the message dictionary 802, and obtains message IDs of the messages obtained in step S1901. Note that the message pattern detecting unit 803 executes subsequent processes only for a message having a message ID that may be obtained from the message table 1100. Accordingly, the message pattern detecting unit 803 does not execute the subsequent processes for a message that is not stored in the message table 1100.

In step S1903, the message pattern detecting unit 803 creates a bit string where a bit corresponding to the message having the message ID obtained in step S1902 is set to "1" and the other bits are set to "0". Then, the message pattern detecting unit 803 references the message pattern table 900, and identifies a message pattern that matches the created bit string. The identified message pattern is hereinafter referred to as a target message pattern.

In step S1904, the message pattern detecting unit 803 references the co-occurrence probability table 1000, and calculates a co-occurrence probability of each fault upon detection of the message pattern identified in step S1903.

For example, a case where the message pattern created in step S1903 corresponds to the "pattern i" within the co-occurrence probability table 1000 illustrated in FIG. 10 is considered. In this case, the message pattern detecting unit 803 calculates a co-occurrence probability of the message pattern of the pattern i and each of the fault 1, the fault 2, . . . , the fault j, . . . , the fault n. For example, the co-occurrence probability of the fault 1 results in 8/Ei. Similarly, the co-occurrence probability of the fault 2 results in 0, . . . , and the co-occurrence probability of the fault j results in Cij/Ei, . . . .

If a co-occurrence probability that exceeds a predetermined threshold value is included in the co-occurrence probabilities calculated in step S1904 ("YES" in step S1905), the message pattern detecting unit 803 outputs a notification that the fault has occurred to a terminal device or the like of an administrator (step S1906). In this case, the message pattern detecting unit 803 may also output the fault type of the fault, the co-occurrence probability of which exceeds a threshold value, to the terminal or the like of the administrator. Then, the flow goes to step S1901.

Alternatively, if the co-occurrence probability that exceeds the predetermined threshold value is not included in the co-occurrence probabilities calculated in step S1904 ("NO" in step S1905), the flow goes to step S1901. Then, the message pattern detecting unit 803 obtains messages output from the components included in the information processing system 700 in the next classification duration. Next, the message pattern detecting unit 803 executes the processes in steps S1902 to S1906.

Figure 20:
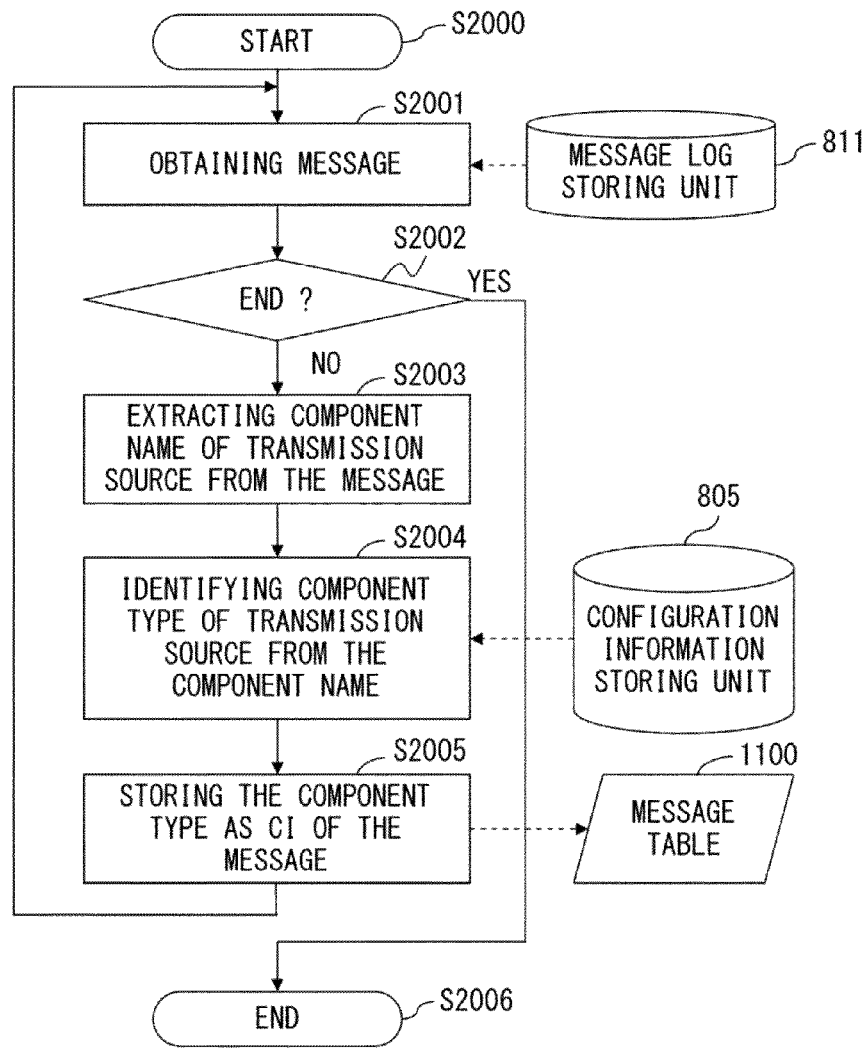
FIG. 20 is a flowchart illustrating a configuration information attachment process executed by the configuration information attaching unit in the embodiment 2.

FIG. 20 is a flowchart illustrating a configuration information attachment process executed by the configuration information attaching unit 806 in this embodiment. The configuration information attachment process by the configuration information attaching unit 806 may be executed independently of the other processes such as the learning process, the message pattern update process, the message pattern detection process and the like at a predetermined time or according to an instruction from a user.

In step S2001, the configuration information attaching unit 806 references the message log storing unit 811. Then, the configuration information attaching unit 806 obtains one message from a message log stored in the message log storing unit 811. Assume that the message is obtained from the beginning of the message log. The obtained message is hereinafter referred to as a target message.

If the end of the message log is detected in step S2002 ("YES" in step S2002), the configuration information attaching unit 806 terminates the configuration information attachment process (step S2006).

Alternatively, if the end of the message log is not detected in step S2002 ("NO" in step S2002), the flow goes to step S2003. In this case, the configuration information attaching unit 806 extracts a component name of a component at a transmission source of the target message from the target message (step S2003).

In which position the component name at the transmission source is inserted within a message may be known in advance depending on the type of a message log. Accordingly, the configuration information attaching unit 806 may identify the position within the target message, in which the component name is inserted, depending on the type of the message log stored in the message log storing unit 811, and may extract a component name from the identified position.

In step S2004, the configuration information attaching unit 806 references the configuration information storing unit 805. Then, the configuration information attaching unit 806 identifies the component type at the transmission source of the target message from the component name extracted in step S2003.

In step S2005, the configuration information storing unit 805 stores the component type identified in step S2004 as the CI of the target message in the message table 1100 stored in the message dictionary 802.

Upon termination of the above described process, the flow goes to step S2001. Then, the configuration information attaching unit 806 obtains the next target message from the message log stored in the message log storing unit 811, and executes the processes in steps S2002 to S2005.

Figure 21:
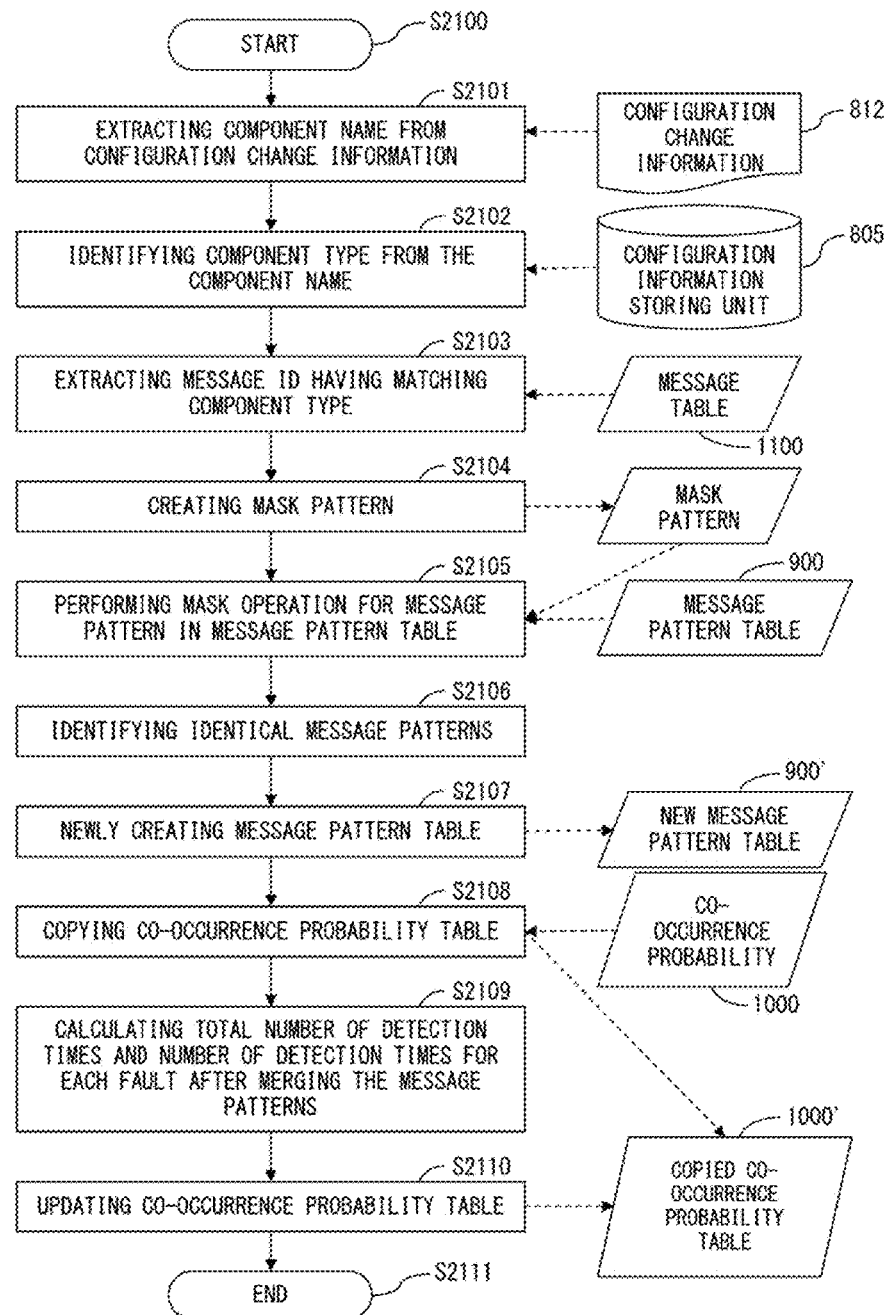
FIG. 21 is a flowchart illustrating a message pattern update process executed by the message pattern updating unit in the embodiment 2.

FIG. 21 is a flowchart illustrating a message pattern update process executed by the message pattern updating unit 807 in this embodiment. The message pattern update process by the message pattern updating unit 807 may be executed independently of the other processes such as the learning process, the message pattern detection process, the configuration information attachment process and the like.

Upon receipt of the configuration change information 812, the message pattern updating unit 807 starts the message pattern update process (step S2100).

In step S2101, the message pattern updating unit 807 extracts a component name of a changed component from the configuration change information 812. A user may input the configuration change information 812 to the managing apparatus 701 by using an input device 2203 to be described later, or a message or the like output from a component included in the information processing system 700 may be used.

In step S2102, the message pattern updating unit 807 references the configuration information storing unit 805. Then, the message pattern updating unit 807 identifies the component type of the changed component from the component name extracted in step S2101.

In step S2103, the message pattern updating unit 807 references the message table 1100 stored in the message dictionary 802. Then, the message pattern updating unit 807 extracts a message ID having a component type that matches the component type identified in step S2102 among CIs stored in the message table 1100.

In step S2104, the message pattern updating unit 807 creates a mask pattern where a bit corresponding to the message ID extracted in step S2103 is set to "0" and the other bits are set to "1".

In step S2105, the message pattern updating unit 807 references the message pattern table 900 stored in the message pattern dictionary 801. Then, the message pattern updating unit 807 performs a mask operation for all message patterns included in the message pattern table 900. The mask operation was described earlier with reference to FIG. 17.

In step S2106, the message pattern updating unit 807 identifies message patterns that may be determined as being identical as a result of the mask operation.

In step S2107, the message pattern updating unit 807 creates a new message pattern table 900' by merging the message patterns identified as being identical in step S2106.

In step S2108, the message pattern updating unit 807 copies the co-occurrence probability table 1000 stored in the message pattern dictionary 801.

In step S2109, the message pattern updating unit 807 calculates the total number of detection times after the message patterns are merged by adding the total numbers of detection times of the message patterns identified as being identical in step S2106. Moreover, the message pattern updating unit 807 calculates the number of detection times for each fault after the message patterns identified as being identical in step S2106 are merged by adding the numbers of detection times of the message patterns for each fault.

In step S2110, the message pattern updating unit 807 reflects the calculation results of step S2109 on the co-occurrence probability table 1000' copied in step S2108.

Specifically, the following process is executed.

Initially, the message pattern updating unit 807 merges the message patterns identified in step S2106 among message patterns included in the co-occurrence probability table 1000' copied in step S2108. Then, the message pattern updating unit 807 reflects the total number of detection times and the number of detection times for each fault, which are calculated in step S2109, on the co-occurrence probability table 1000'.

Upon termination of the above described process, the message pattern updating unit 807 terminates the message pattern update process (step S2111).

In this embodiment, the message pattern updating unit 807 creates the message pattern table 900' from the message pattern table 900. This is equivalent to an update of the message pattern table 900 to contents of the message pattern table 900'.

Similarly, the message pattern updating unit 807 creates the co-occurrence probability table 1000' from the co-occurrence probability table 1000 in this embodiment. This is equivalent to an update of the co-occurrence probability table 1000 to contents of the co-occurrence probability table 1000'.

FIG. 22 illustrates a configuration example of the managing apparatus 701 according to this embodiment.

The managing apparatus 701 illustrated in FIG. 22 includes a CPU 2201, a memory 2202, an input device 2203, an output device 2204, an external storage device 2205, a medium driving device 2206 and a network connecting device 2208. These devices are interconnected by a bus, so that they may mutually transmit/receive data.

The CPU 2201 is an arithmetic unit for executing a program that implements the fault detection in the embodiments in addition to implementing peripheral devices or various types of software.

The memory 2202 is a volatile storage device used to execute a program. For example, a RAM or the like is available as the memory 2202.

The input device 2203 is unit for externally inputting data. For example, a keyboard, a mouse or the like is available as the input device 2203.

The output device 2204 is a device for outputting data and the like to a display device or the like. The output device 204 may also include a display device.

The external storage device 2205 is a nonvolatile storage device for storing a program that implements the fault detection in the embodiments in addition to a program and data, which the managing apparatus 701 needs to run. For example, a magnetic disk storage device or the like is available as the external storage device 2205.

The medium driving device 2206 is a device for outputting data of the memory 2202 or the external storage device 2205 to a portable storage medium 2207 such as a floppy disk, an MO disk, a CD-R, a DVD-R or the like, or for reading a program, data and the like from the portable storage medium 2207.

The network connecting device 2208 is a device for making a connection to a network 702.

Note that a non-transitory medium is available as a storage medium, such as the memory 2202, the external storage device 2205, the portable storage medium 2207 or the like, which may be read by an information processing device.

Additionally, FIG. 22 illustrates merely one example of the configuration of the managing apparatus 701, and the configuration of the managing apparatus 701 is not limited to that illustrated in FIG. 22. For example, part of the apparatus illustrated in FIG. 22 may be used as needed, or a new device not illustrated in FIG. 22 may be added.

Figure 23:
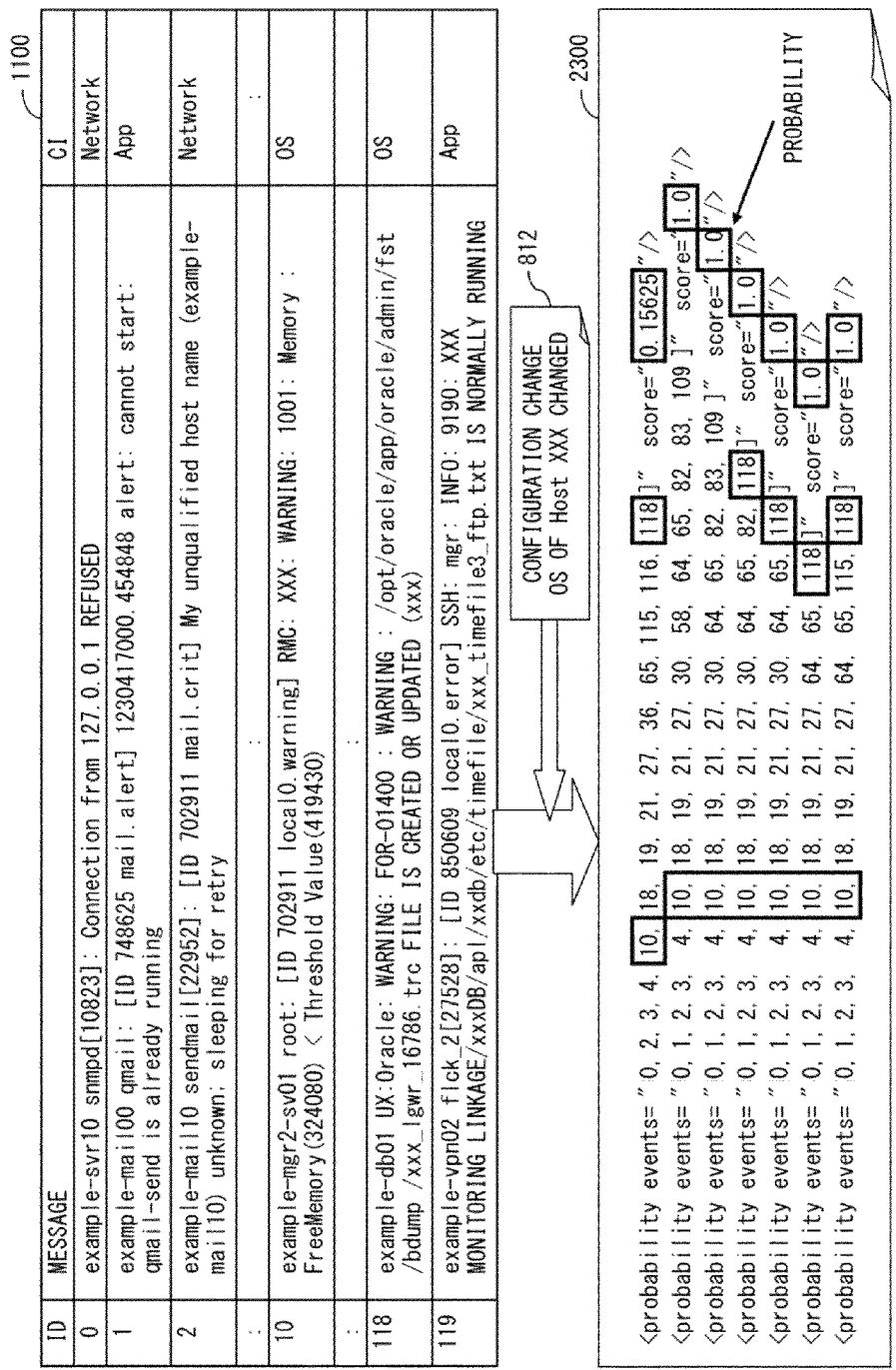
FIG. 23 is an explanatory view of an example of an effect achieved by the managing apparatus according to the embodiment 2.

FIG. 23 is an explanatory view of one example of an effect achieved by the managing apparatus 701 according to this embodiment.

A co-occurrence probability table 2300 illustrated in FIG. 23 is represented with part of the co-occurrence probability table 1000, for example, the co-occurrence probability of each message pattern and the fault j in the co-occurrence probability table 1000 illustrated in FIG. 10.

Each <probability> tag illustrated in FIG. 23 includes an events attribute indicating a message pattern, and a score attribute indicating a co-occurrence probability of the message pattern and the fault j. The events attribute is information including only a message ID of a message included in a message pattern, for example, a message ID set to "1" in the co-occurrence probability table 1000 illustrated in FIG. 10.

For example, as illustrated in FIG. 23, the message pattern updating unit 807 detects, based on the configuration change information 812, that an OS of Host XXX has been changed. Then, the message pattern updating unit 807 references the message table 1100, and identifies messages having the same CI as a changed component type, namely, "OS" in FIG. 23.

Then, the message pattern updating unit 807 deletes, from the co-occurrence probability table 2300, the message IDs of the identified messages, namely, message IDs "10" and "118" enclosed with a square in FIG. 23. Then, the message pattern updating unit 807 recalculates and updates the co-occurrence probability of each message pattern, namely, the value of the score attribute enclosed with a square in FIG. 23.

As described above, if the messages having the message IDs "10" and "118" output so far are not output anymore because the OS of Host XXX has been changed, the message IDs "10" and "118" are deleted also from the co-occurrence probability table 2300. Accordingly, the co-occurrence probability of the message pattern that does not include the messages having the message IDs "10" and "118" due to the change of the OS of Host XXX may be obtained from the co-occurrence probability table 2300.

As a result, even if a component such as the OS of Host XXX or the like is changed, the fault management may be performed for the information processing system 700, for example, by using the message pattern table 900 and the co-occurrence probability table 1000 without discarding them as a result of learning.

Additionally, already learned results may be used even if a component is changed. Therefore, even in an environment such as a cloud environment where a component is frequently changed, the need for newly executing the learning process each time a component is changed is eliminated. Accordingly, a workload imposed on the fault management is reduced even in an environment such as a cloud environment where a component is frequently changed.

Furthermore, the fault management of the information processing system 700 may be performed by using already learned results such as the message pattern table 900 and the co-occurrence probability table 1000 while the learning process is newly executed. Therefore, the fault management may be continuously performed, leading to improvements in the reliability of the fault management.

Still further, in the message pattern update process in this embodiment, merging of duplicate message patterns in the message pattern table 900, and the additions of the total number of detection times and the number of detection times in the co-occurrence probability table 1000 are the main processes as described with reference to FIG. 21. Accordingly, the message pattern table 900 and the co-occurrence probability table 1000 may be updated faster than newly executing the learning process.

Still further, with the message pattern update process described with reference to FIG. 21, the message pattern table 900 and the co-occurrence probability table 1000, which are not used any more as a result of the update process, may be stored in the external storage device 2205 or the like. In this case, the message pattern table 900 and the co-occurrence probability table 1000 may be used as a replacement for the message pattern table 900' and the co-occurrence probability table 1000' when needed.

In the above provided description, the pattern 1 to the pattern ($2^m-1$) represented in the message pattern table 900 may be cited as one example of the first message pattern. Moreover, the co-occurrence probability table 1000 may be cited as one example of the fault co-occurrence information. Furthermore, the message pattern dictionary 801 may be cited as one example of the storing unit. Still further, the pattern 2' illustrated in FIG. 6 may be cited as one example of the second message pattern. Still further, the message pattern detecting unit 803 may be cited as one example of the determining unit. Still further, the message pattern updating unit 807 may be cited as one example of the updating unit.

As described above, with the disclosed managing apparatus, a workload imposed on the fault management may be lightened.

The process procedures represented with the flowcharts illustrated in FIGS. 18 to 21 are not intended to limit the order of the processes. Accordingly, the order of the processes may be naturally changed if possible.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been descried in detail, it should be understood that the various changes, substitutions, and alterations could be made hereto without departing from the spirit and scope of the invention.

What is claimed is:

1. A managing apparatus for managing an information processing system including a plurality of components, the managing apparatus comprising:
- a storing unit configured to store fault co-occurrence information storing the number of detection times that a first message pattern indicating a message group including one or two or more messages received from the information processing system in a predetermined duration is detected when a fault has occurred in the information processing system;
- a determining unit configured to detect the first message pattern from the one or two or more messages received from the information processing system in the predetermined duration, to read the number of detection times from the fault co-occurrence information stored in the storing unit, to calculate a co-occurrence probability of the fault and the first message pattern based on the number of detection times, and to determine that the fault has occurred when the co-occurrence probability is equal to or higher than a threshold value; and
- an updating unit configured to create a second message pattern indicating a message group obtained by excluding a message output by a changed component from the first message pattern upon detecting that the component has been changed, and to update the first message pattern stored in the fault co-occurrence information to the second message pattern,
- wherein the determining unit calculates the co-occurrence probability of the fault and the first message updated by the updating unit.

2. The managing apparatus according to claim 1, wherein the determining unit detects the first message pattern according to message pattern information storing messages included in a message pattern for each message pattern indicating the message group including one or two or more messages received from the information processing system in the predetermined duration.

3. The managing apparatus according to claim 2, wherein the updating unit excludes the message output by the changed component from the message pattern information upon detecting that the component has been changed, and updates the message pattern information to new message pattern information by merging message patterns that become identical as a result of excluding the message.

4. The managing apparatus according to claim 2, wherein the updating unit merges message patterns that are included in the fault co-occurrence information and become identical as a result of excluding the message output by the changed component from the message pattern information, and updates the fault co-occurrence information to new fault co-occurrence information by summing up the number of detection times.

5. The managing apparatus according to claim 1, wherein the updating unit identifies a message output by a component according to message information stored by being associated with component information indicating the component that outputs the message for each message.

6. The managing apparatus according to claim 5, further comprising
- a configuration information attaching unit configured to extract the component information included in the message upon receipt of the message from the information processing system, and to store the component information in the message information by associating the component information with the message.

7. The managing apparatus according to claim 1, further comprising
- a learning unit configured to create a third message pattern indicating a message group by reading the message group including one or two or more messages received in the predetermined duration from a message log storing messages received from the information processing system, and to store the number of detection times that the third message pattern is detected when a fault has occurred in the information processing system in the predetermined duration.

8. A managing method for managing an information processing system including a plurality of components, the managing method comprising:
- detecting a first message pattern from one or two or more messages received from the information processing system in a predetermined duration;
- reading the number of detection times that the first message pattern is detected when a fault has occurred in the information processing system from fault co-occurrence information stored in a storing unit configured to store the fault co-occurrence information storing the number of detection times, and calculating a co-occurrence probability of the fault and the first message pattern based on the number of detection times;
- determining that the fault has occurred when the co-occurrence probability is equal to or higher than a threshold value; and
- creating a second message pattern indicating a message group obtained by excluding a message output by a changed component from the first message pattern upon detecting that the component has been changed, and updating the first message pattern stored in the fault co-occurrence information to the second message pattern,
- calculating, when the first message is updated, the co-occurrence probability of the fault and the updated first message.

9. A storage medium on which is stored a program for causing a computer to execute a process for managing an information processing system including a plurality of components, the process comprising:
- detecting a first message pattern from one or two or more messages received from the information processing system in a predetermined duration;
- reading the number of detection times that the first message pattern is detected when a fault has occurred in the information processing system from fault co-occurrence information stored in a storing unit configured to store the fault co-occurrence information storing the number of detection times, and calculating a co-occurrence probability of the fault and the first message pattern based on the number of detection times;
- determining that the fault has occurred when the co-occurrence probability is equal to or higher than a threshold value; and
- creating a second message pattern indicating a message group obtained by excluding a message output by a changed component from the first message pattern upon detecting that the component has been changed, and updating the first message pattern stored in the fault co-occurrence information to the second message pattern,
- calculating, when the first message is updated, the co-occurrence probability of the fault and the updated first message.

* * * * *